United States Patent
Nakano

(10) Patent No.: US 7,636,980 B2
(45) Date of Patent: Dec. 29, 2009

(54) WIPER BLADE HAVING COVER MEMBER

(75) Inventor: Hiroyuki Nakano, Kosai (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 863 days.

(21) Appl. No.: 11/229,605

(22) Filed: Sep. 20, 2005

(65) Prior Publication Data

US 2006/0064841 A1 Mar. 30, 2006

(30) Foreign Application Priority Data

Sep. 28, 2004 (JP) ............................. 2004-282496

(51) Int. Cl.
 *B60S 1/38* (2006.01)
 *B60S 1/40* (2006.01)
(52) U.S. Cl. .............................. 15/250.201; 15/250.44; 15/250.32
(58) Field of Classification Search .............. 15/250.43, 15/250.32, 250.44, 250.46, 250.31, 250.201, 15/250.361
 See application file for complete search history.

(56) References Cited

U.S. PATENT DOCUMENTS

| | | | | |
|---|---|---|---|---|
| 3,088,155 A | * | 5/1963 | Smithers | 15/250.201 |
| 4,959,882 A | * | 10/1990 | Henderson et al. | 15/250.04 |
| 5,412,177 A | | 5/1995 | Clark | |
| 5,881,428 A | * | 3/1999 | Simmons | 15/250.04 |

2005/0166349 A1 8/2005 Nakano et al.

FOREIGN PATENT DOCUMENTS

| | | |
|---|---|---|
| DE | 4146968 | * 11/1992 |
| EP | 0 791 514 | 8/1997 |
| FR | 2 759 961 | 8/1998 |
| JP | A-H03-118148 | 12/1991 |
| JP | U-4-108470 | 9/1992 |
| JP | A-11-514945 | 4/1997 |
| JP | A-11-059335 | 3/1999 |
| JP | A-2003-146190 | 5/2003 |
| WO | WO 99/19186 | 4/1999 |

OTHER PUBLICATIONS

Office Communication issued from European Patent Office issued on Dec. 20, 2005 for the corresponding European patent application No. 05020593.9-2424.

(Continued)

*Primary Examiner*—Gary K Graham
(74) *Attorney, Agent, or Firm*—Posz Law Group, PLC

(57) ABSTRACT

A wiper blade includes a wiper strip, a lever assembly and a cover member. The lever assembly has a connecting arrangement and holding claws. The connecting arrangement is connected to a wiper arm. The holding claws hold the wiper strip. The cover member has a cover opening, which is opened on a wiper strip side thereof. The cover member receives the lever assembly through the cover opening. In an interior space between the cover member and the wiper strip, holder end side openings, each of which is a part of the cover opening, are covered by two connecting arrangement end side cover parts. In this way, in the interior space between the cover member and the wiper strip, spaces, into which fluid intrudes, are reduced.

10 Claims, 10 Drawing Sheets

OTHER PUBLICATIONS

Office Action dated Jan. 20, 2009 in corresponding Japanese patent application No. 2004-282496 (and English translation).

Examination Report from European Patent Office issued on Mar. 6, 2007 for the corresponding European patent application No. 05 020 593.9-2424.

Office Action dated Mar. 21, 2008 in corresponding Chinese Patent Application No. 200510107544.9 (and English translation).

Office Action from European Patent Office issued on Aug. 9, 2007 for the corresponding European patent application No. 05 020 593.9.

* cited by examiner

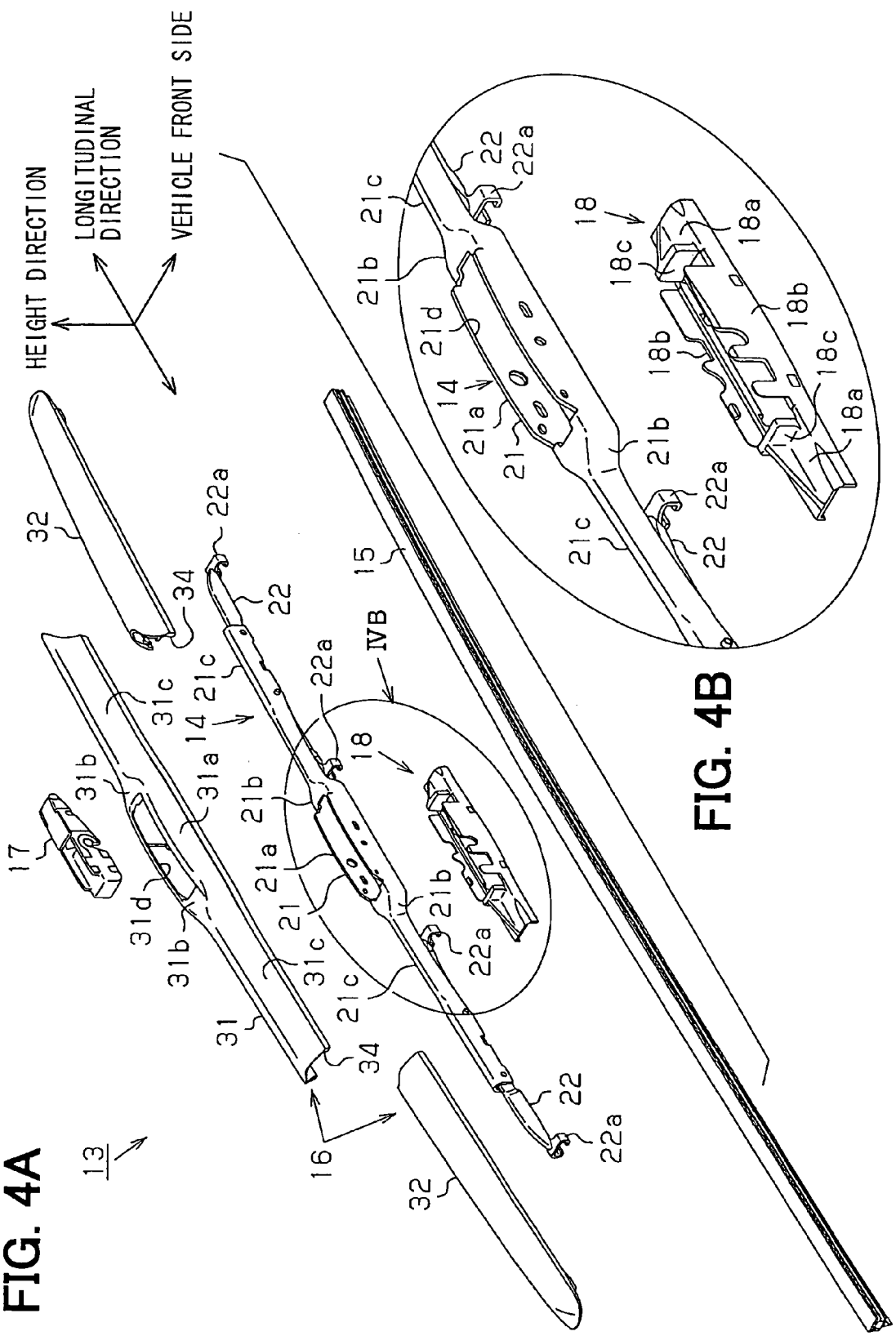

h2>h1 h4 > h3 h4 > h3 h2 > h1

US 7,636,980 B2

WIPER BLADE HAVING COVER MEMBER

CROSS REFERENCE TO RELATED APPLICATION

This application is based on and incorporates herein by reference Japanese Patent Application No. 2004-282496 filed on Sep. 28, 2004.

BACKGROUND OF THE INVENTION

1. Field of the Invention

The present invention relates to a wiper blade having a cover member.

2. Description of Related Art

A wiper blade of a wiper device provided in a vehicle includes a lever member (e.g., a tournament type lever assembly) and a wiper strip. The lever member is connected to a wiper arm, and the wiper strip is held by holding parts of the lever member and wipes a wiping surface, such as a front glass or a windshield of the vehicle. One such wiper blade includes a cover member, which has a cover opening at a wiper strip side thereof and receives the lever member through the cover opening (see, for example, Japanese Unexamined Utility Model Publication No. H04-108470). In this type of wiper blade, the cover member protects the wiper strip and improves a total appearance of the wiper blade.

However, in the above type of wiper blade, since the lever member is received through the cover opening of the cover member, a hollow structure exits due to an interior space between the cover member and the wiper strip. When the vehicle is traveling at a high speed, liquid (e.g., rain or washer fluid) penetrates along with air into the above-described interior space (the hollow part) through an opened portion (an opening), which is opened on a vehicle front side. Then, as schematically shown in FIG. 12, the fluid (the air and liquid) flows in the longitudinal direction of the wiper blade toward the distal end of the wiper blade 51 along the interior space (hollow part) of the wiper blade 51. When the fluid collides against, for example, the holding parts 51a of the lever member, the collided fluid is discharged toward the wiping surface 52 to form streaks on the wiping surface (see, for example, arrows indicated by dot-dot-dash lines in FIG. 12). This causes low visibility.

SUMMARY OF THE INVENTION

The present invention addresses the above disadvantage. Thus, it is an objective of the present invention to provide a wiper blade, which includes a cover member and enables improved visibility upon wiping operation even at time of high speed traveling of a vehicle.

To achieve the objective of the present invention, there is provided a wiper blade, which includes a wiper strip, a lever member, a cover member and a flow regulating means. The wiper strip wipes a wiping surface of a vehicle. The lever member includes a connecting arrangement and at least one holding part. The connecting arrangement is connected to a wiper arm of the vehicle. The at least one holding part holds the wiper strip. The cover member includes a cover opening, which is opened on a wiper strip side of the cover member. The cover member receives at least a portion of the lever member through the cover opening. The flow regulating means is arranged in an interior space between the cover member and the wiper strip. The flow regulating means is for limiting a flow of fluid in a longitudinal direction of the wiper strip in the interior space.

BRIEF DESCRIPTION OF THE DRAWINGS

The invention, together with additional objectives, features and advantages thereof, will be best understood from the following description, the appended claims and the accompanying drawings in which:

FIG. 4A is an exploded view of the wiper blade;

FIG. 4B is an enlarged partial view of a circled portion indicated by an arrow IVB in FIG. 4A;

DETAILED DESCRIPTION OF THE INVENTION

An embodiment of the present invention will be described with reference to the accompanying drawings.

Figure 1:
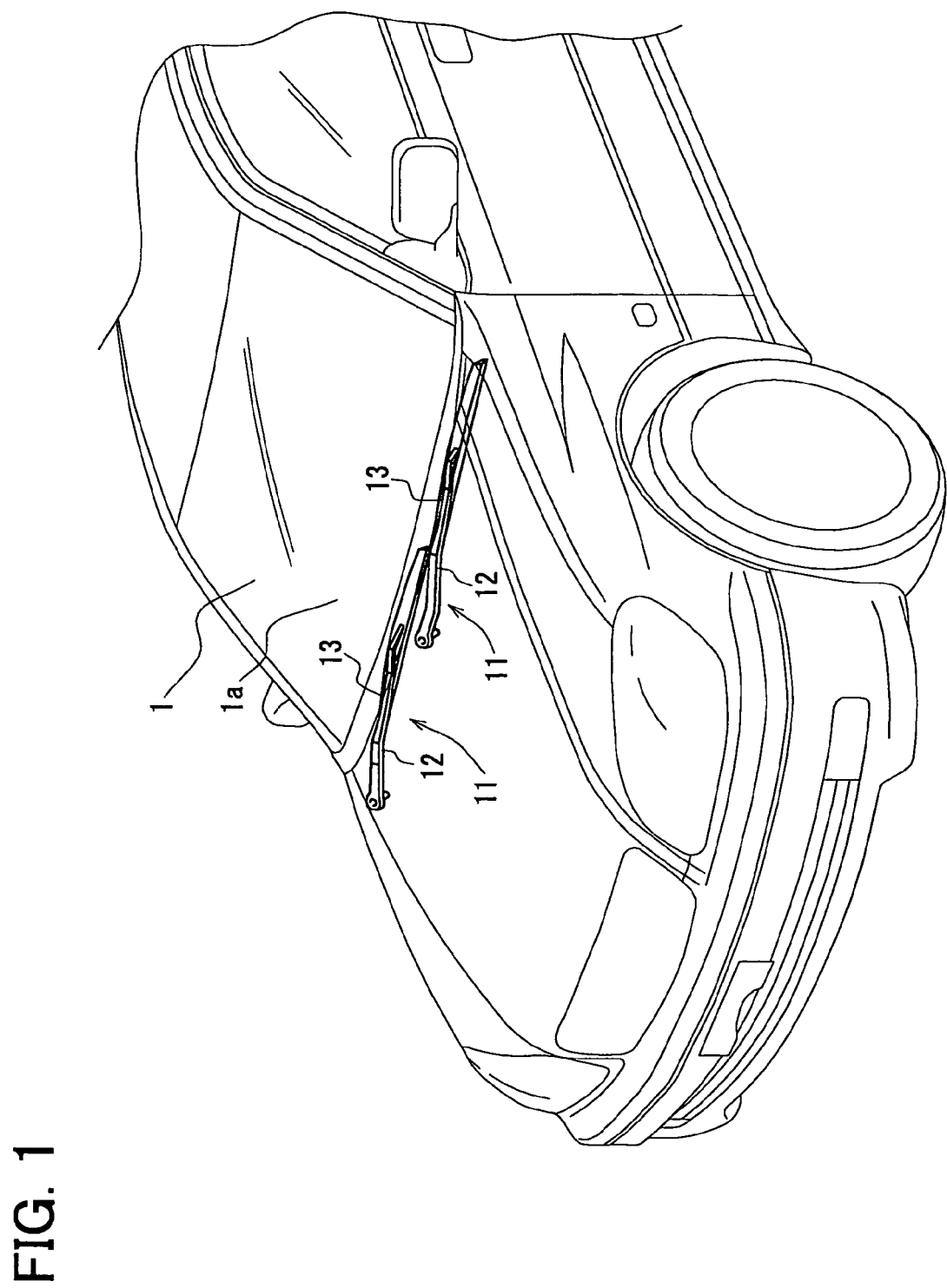
FIG. 1 is a partial perspective view of a vehicle, in which a wiper blade according to an embodiment of the present invention is installed.
Figure 2:
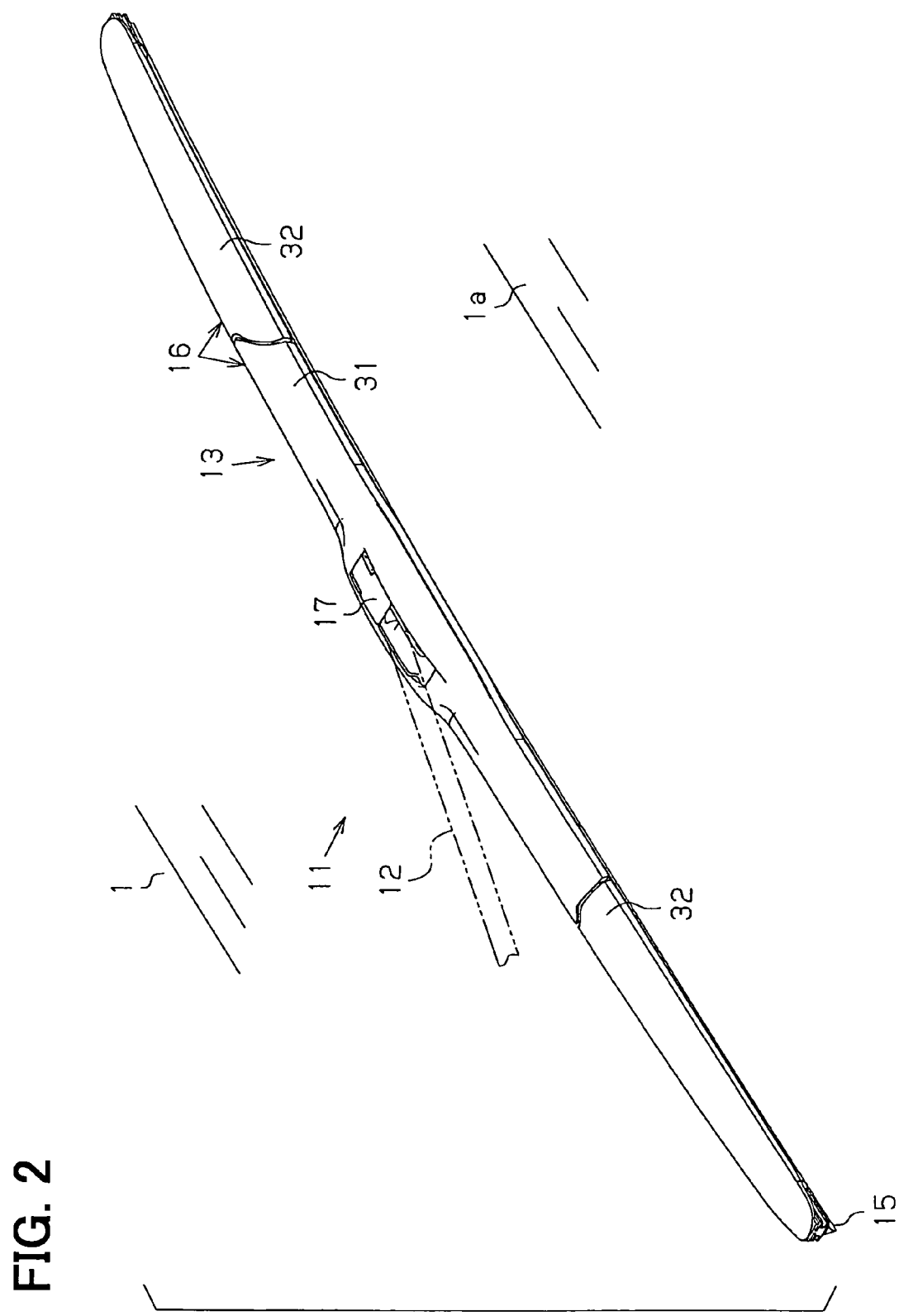
FIG. 2 is a perspective enlarged view showing the wiper blade.
Figure 3A:
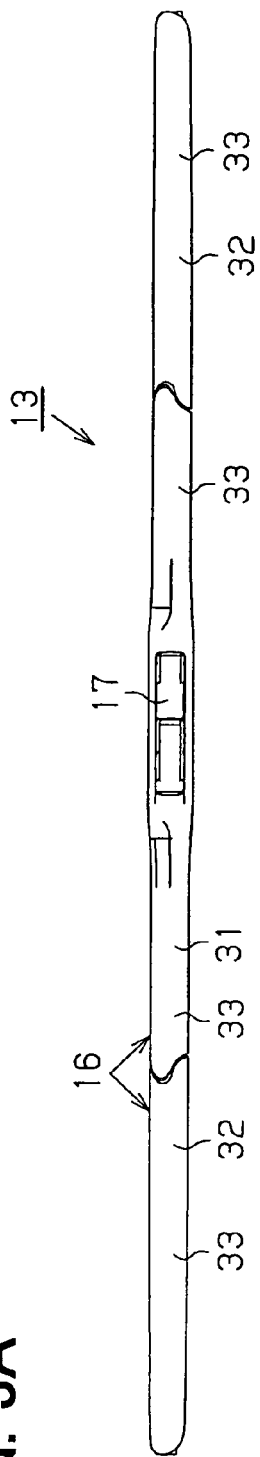
FIG. 3A is a plan view of the wiper blade.
Figure 3B:
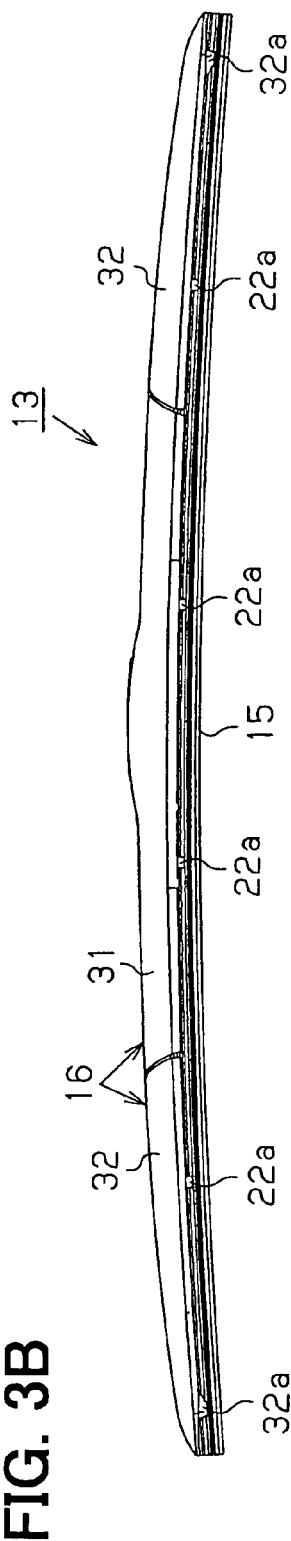
FIG. 3B is a front view of the wiper blade.
Figure 3C:
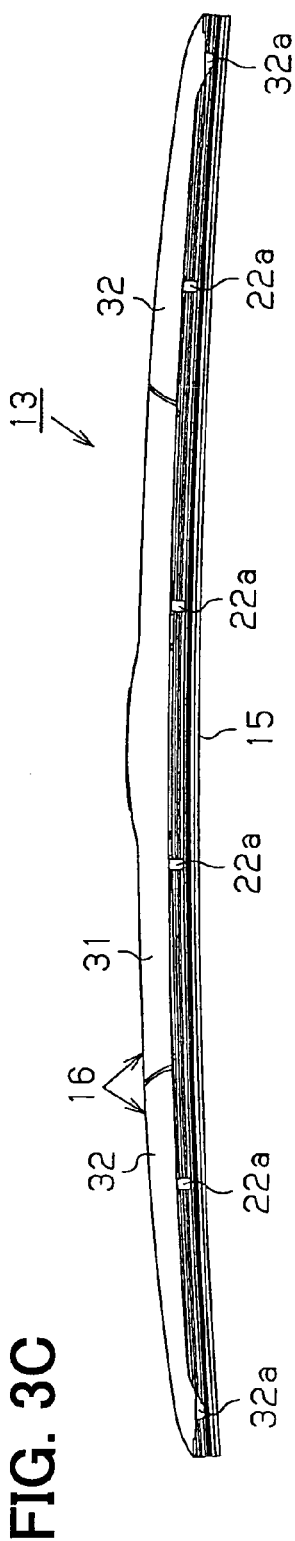
FIG. 3C is a rear view of the wiper blade.

With reference to FIGS. 1 and 2, a vehicle wiper system of the present embodiment includes wiper devices 11. In the present embodiment, although the two wiper devices 11 are depicted, the number of the wiper devices 11 is not limited to the two and may be changed to one or greater than two. Each wiper device 11 wipes raindrops adhered to a wiping surface 1a of a front glass (windshield) 1 of the vehicle. The wiper device 11 includes a wiper arm 12 and a wiper blade 13. A base end of the wiper arm 12 is secured to a pivot shaft, which is reciprocally rotated by a drive force of a wiper motor (not shown). When the pivot shaft is reciprocally rotated, the wiper arm 12 is reciprocally swung accordingly. The wiper blade 13 is rotatably connected to a distal end of the wiper arm 12. A spring (not shown) is installed to the wiper arm 12 to apply an urging force for urging the wiper blade 13 against the wiping surface 1a.

As shown in FIGS. 4A and 4B, the wiper blade 13 includes a lever assembly (serving as a lever member) 14, a wiper strip 15, a cover member 16, a connecting member 17 and a flow regulating plate (serving as a center cover member that constitute a flow regulating means) 18.

The lever assembly 14 is formed into a tournament style structure that includes three levers, each of which is made through a press-working operation of a corresponding metal plate material. These three levers include a primary lever 21 and two secondary levers 22. The primary lever 21 includes a connecting arrangement 21a, which is rotatably connected to the wiper arm 12. The secondary levers 22 are rotatably connected to longitudinal ends, respectively, of the primary lever 21.

Figure 6:
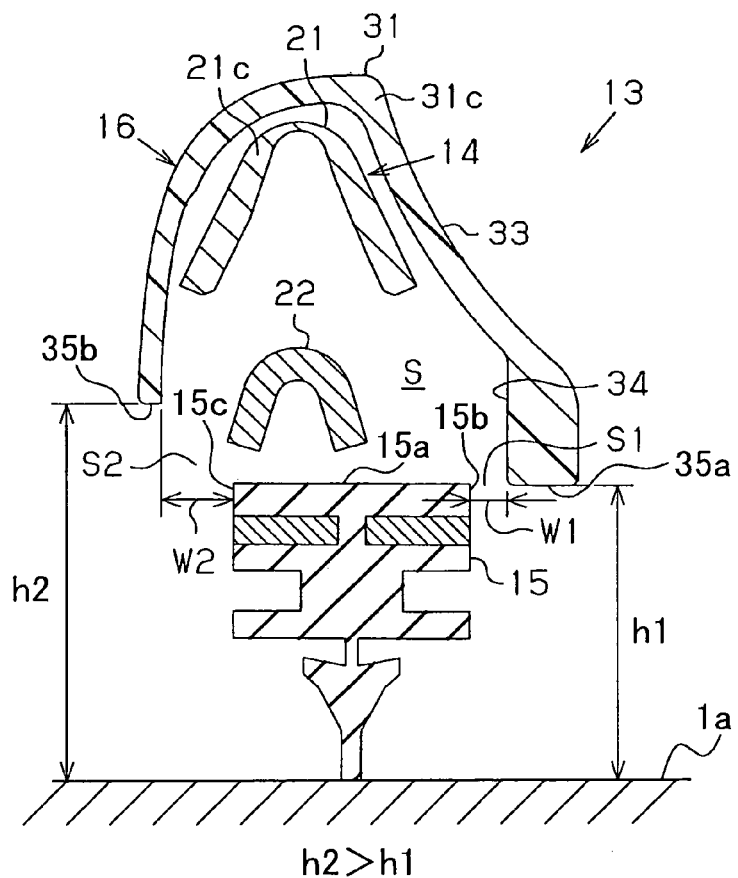
FIG. 6 is a cross sectional view taken along line VI-VI in FIG. 5.

The primary lever 21 shows a mountain fold shape (a U-shape having an opening on a wiping surface 1a side thereof) when the primary lever 21 is seen in the longitudinal direction (FIG. 6). The primary lever 21 includes the connecting arrangement 21a, width decreasing sections 21b and arms 21c. The connecting arrangement 21a has a width, which is measured in a direction perpendicular to the longitudinal direction and is larger than that of the rest of the primary lever 21. The width decreasing sections 21b extend longitudinally from longitudinal ends, respectively, of the connecting arrangement 21a and have the width that progressively decreases toward its longitudinal end. The arms 21c extend longitudinally from the longitudinal ends, respectively, of the width decreasing sections 21b. A top opening 21d (FIG. 8) is formed in a top part (a top side that is apart from the wiping surface 1a) of the connecting arrangement 21a to extend through the connecting arrangement 21a in a top-bottom direction (the vertical direction that is perpendicular to the wiping surface 1a). The connecting member 17, which is connected to the wiper arm 12d (which can hold the distal end of the wiper arm 12), is rotatably supported in an interior of the connecting arrangement 21a.

Holding claws 22a are formed in longitudinal ends of each secondary lever 22. The holding claws 22a serve as holding parts, which hold (clamp) the wiper strip 15. When each holding claw 22a is seen in the longitudinal direction, the holding claw 22a has a generally U-shape, which opens at its bottom side (the wiping surface 1a side), and opposed distal ends of the holding claw 22 extend inwardly toward each other to reduce an open width therebetween. When the wiper strip 15, which is made of, for example, a rubber material and wipes the wiping surface 1a, is held by the holding claws (specifically, four opening claws) 22a, the wiper strip 15 is supported at four points along the length of the wiper strip 15. With this structure, the urging force, which is applied from the wiper arm 12 against the wiping surface 1a, is spread along the length (four points) of the wiper strip 15.

As shown in FIGS. 3A to 4B, the cover member 16 includes a center cover portion 31 and two side cover portions 32, which are made of a synthetic resin material and are secured to the lever assembly 14 (the primary lever 21). The side cover portions 32 are arranged at longitudinal ends, respectively, of the center cover portion 31 and are rotatable relative to the primary lever 21.

The center cover portion 31 shows a mountain fold shape (a U-shape having an opening on a wiping surface 1a side thereof) when the center cover portion 31 is seen in the longitudinal direction (FIG. 6). The center cover portion 31 has a connecting arrangement receiving part 31a, width decreasing section receiving parts 31b and arm receiving parts 31c. The connecting arrangement receiving part 31a has a width, which is measured in a direction perpendicular to the longitudinal direction and is larger than that of the rest of the center cover portion 31 to receive the connecting arrangement 21a therein. Each width decreasing section receiving part 31b is formed to receive the corresponding width decreasing section 21b. Each arm receiving part 31 is formed to receive the corresponding arm 21c (and one half of the corresponding secondary lever 22). A communicating opening 31d is formed in a top part (a top side that is apart from the wiping surface 1a) of the connecting arrangement receiving part 31a of the center cover portion 31 to extend through the connecting arrangement receiving part 31a in the top-bottom direction (the vertical direction that is perpendicular to the wiping surface 1a) at a position that corresponds to the top opening 21d of the connecting arrangement 21a.

Figure 5:
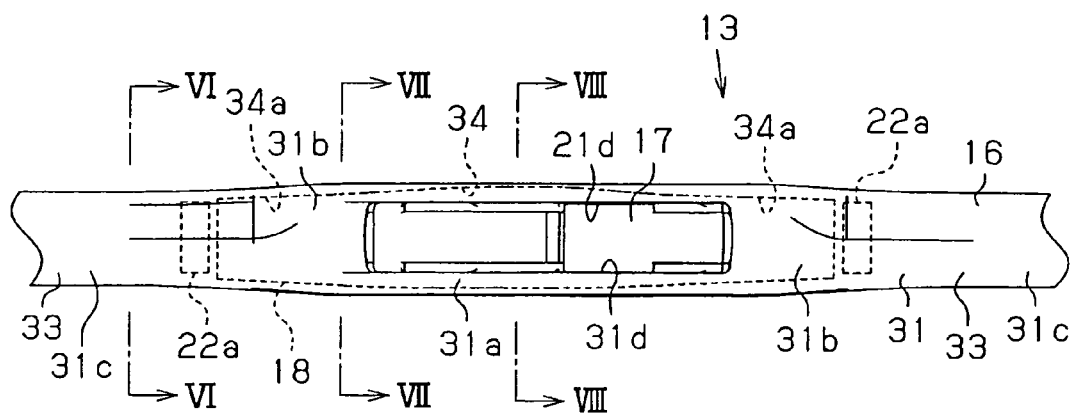
FIG. 5 is a schematic partial plan view of the wiper blade.
Figure 7:
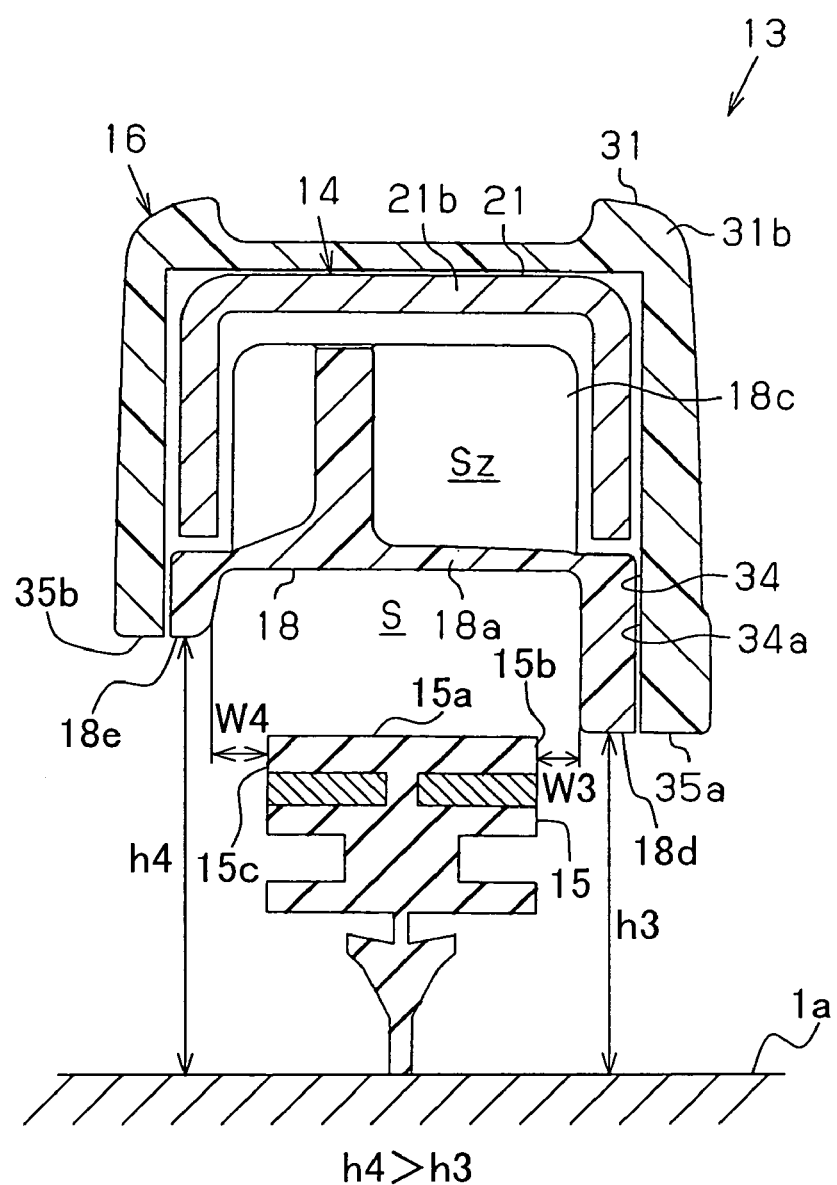
FIG. 7 is a cross sectional view taken along line VII-VII in FIG. 5.
Figure 8:
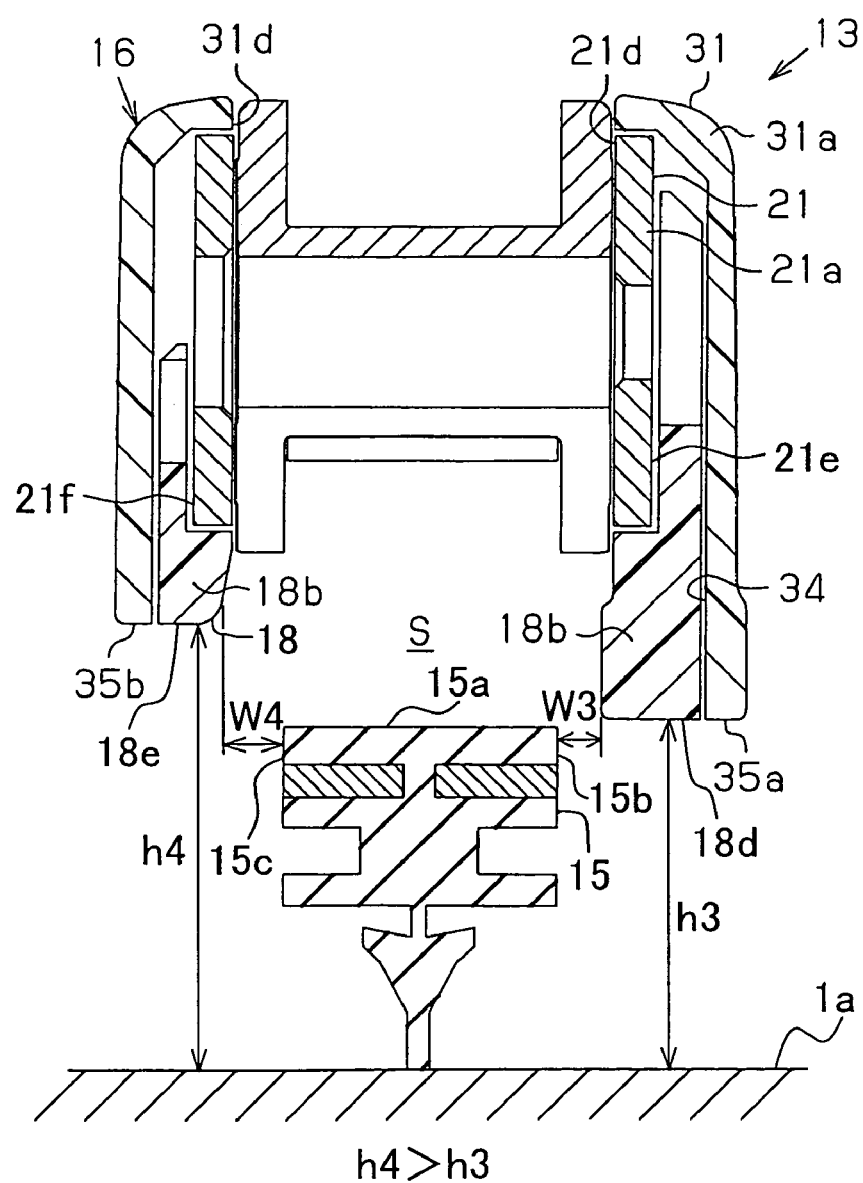
FIG. 8 is a cross sectional view taken along line VIII-VIII in FIG. 5.
Figure 9:
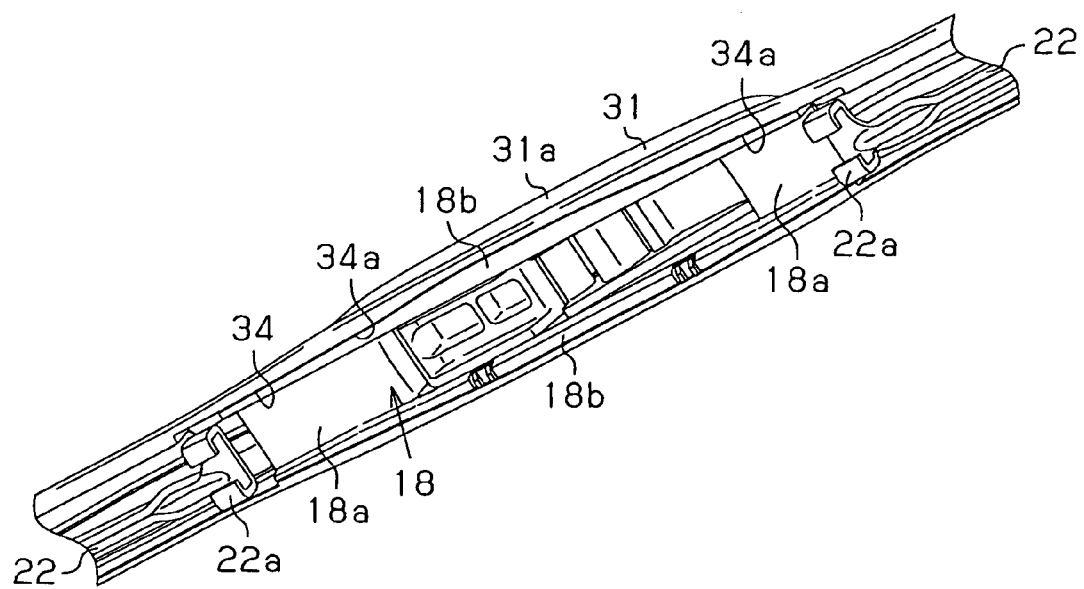
FIG. 9 is a schematic partial bottom perspective view of the wiper blade without a wiper strip.

Each side cover portion 32 shows a mountain fold shape (a U-shape having an opening on a wiping surface 1a side thereof) when the side cover portion 32 is seen in the longitudinal direction. The side cover portion 32 is formed to receive a generally one half (a generally one half on a side near the corresponding end of the wiper strip 15) of the secondary lever 22 and a top part (a top side apart from the wiping surface 1a) of a protruding section of the wiper strip 15, which protrudes longitudinally from the secondary lever 22. Furthermore, a holding part 32a (FIGS. 3B-3C) is formed in a distal end of the side cover portion 32 to hold the corresponding end of the wiper strip 15. The cover member 16 (the center cover portion 31 and the side cover portions 32) of the present embodiment receives the top part (the top side apart from the wiping surface 1a) of the wiper strip 15 along the entire length thereof. However, FIGS. 6-8 show the state (relaxed state) where the wiper strip 15 is not urged to contact the wiping surface 1a, so that the top part of the wiper strip 15 is not received in the cover member 16 in these drawings. In the present embodiment, a fin surface 33 (FIG. 6) is formed on a vehicle front side of the cover member 16 (the center cover portion 31 and the side cover portions 32). The fin surface 33 generates an urging force for urging the wiper strip 15 against the wiping surface 1a when the fin surface 33 receives a head wind at the time of traveling of the vehicle. In the present embodiment, a wiper strip 15 side opening of the cover member 16 (the center cover portion 31 and the side cover portions 32) forms a cover opening 34, which serves as a wiper strip side opening (FIGS. 6-9). In the cover opening 34, opposed longitudinal end parts (parts corresponding to the width decreasing section receiving parts 31b) of the connecting arrangement receiving part 31a, which are longitudinally positioned between the holding claws 22a that are adjacent to the longitudinal ends of the connecting arrangement 21a, form connecting arrangement end side openings 34a (FIGS. 5, 7 and 9).

Here, in the wiper blade 13 of the present embodiment, as indicated in FIG. 6, a transverse center of the wiper strip 15 is deviated from a transverse center of the cover member 16 (the cover opening 34) on the vehicle front side (on the right side in FIG. 6) in a direction perpendicular to the longitudinal direction of the wiper strip 15 to form an inflow reducing structure that constitutes a part of the flow regulating means.

Furthermore, in the wiper blade 13 of the present embodiment, as indicated in FIG. 6, two opposed lateral walls 35a, 35b, which define the cover opening 34 of the cover member 16, are set such that a height h2 of the vehicle rear side lateral wall 35b, which is measured from the wiping surface 1a to the vehicle rear side lateral wall 35b, is greater than a height h1 of the vehicle front side lateral wall 35a, which is measure from the wiping surface 1a to the vehicle front side lateral wall 35a (the lateral wall 35b being placed in a higher position in FIG. 6 relative to the lateral wall 35a), so that there is formed a rear side opening increasing structure, which forms another part of the flow regulating means.

With reference to FIGS. 4A, 4B and 9, the flow regulating plate 18 is made of a resin material and is fitted to the lever assembly 14 (the primary lever 21) and the cover member 16 (the center cover portion 31). The flow regulating plate 18 includes two connecting arrangement end side cover parts (serving as cover parts) 18a and two cover part connectors 18b, which are formed integrally. The cover part connectors 18b connect between the connecting arrangement end side cover parts 18a. FIG. 9 is a schematic perspective view (obliquely seen from the bottom side) of the wiper blade 13 without the wiper strip 15.

As shown in FIGS. 7 and 9, each connecting arrangement end side cover part 18a is configured such that a bottom surface (a surface opposed to the wiping surface 1a) is formed into a generally flat plate like surface to cover the corresponding connecting arrangement end side opening 34a (including the opening of the width decreasing section). Furthermore, a partition wall 18c extends upwardly from a connecting arrangement 21a side (a flow regulating plate 18 center side) end of a top surface of each connecting arrangement end side covering portion 18a to partition the interior space between the connecting arrangement 21a and the corresponding width decreasing section 21b (FIGS. 4A, 4B and 7).

The two cover part connectors 18b are arranged generally parallel to one another in such a manner that each cover part connector 18b connects between a transverse end (an end in the transverse direction perpendicular to the longitudinal direction) of one of the connecting arrangement end side cover parts 18a to a corresponding transverse end of the other one of the connecting arrangement end side cover parts 18a. As shown in FIG. 8, cover part connectors 18b are configured to reduce a size of the cover opening 34 at the location corresponding to the connecting arrangement 21a. More specifically, each cover part connector 18b fills a corresponding space between the cover opening 34 (lateral wall 35a, 35b) and a corresponding opposed lateral wall 21e, 21f of the connecting arrangement 21a.

With reference to FIGS. 7 and 8, the flow regulating plate 18 includes a vehicle front side lateral wall 18d and a vehicle rear side lateral wall 18e, which correspond to the vehicle front side lateral wall 35a and the vehicle rear side lateral wall 35b, respectively, of the cover member 16. A height h4 of the vehicle rear side lateral wall 18e of the flow regulating plate 18, which is measured from the wiping surface 1a to the vehicle rear side lateral wall 18e, is greater than a height h3 of the vehicle front side lateral wall 18d of the flow regulating plate 18, which is measured from the wiping surface 1a to the vehicle front side lateral wall 18d, so that there is formed a rear side opening increasing structure, which forms another part of the flow regulating means.

In the wiper blade 13 configured in the above manner, the cover member 16 protects the lever assembly 14 and the wiper strip 15 from, for example, snow and freezing and improves appearance of the wiper blade 13.

Next, characteristic advantages of the above embodiment will be described.

(1) As shown in FIG. 7, in the interior space S (hollow part) between the cover member 16 and the wiper strip 15, the portions of the wiper strip side opening (the connecting arrangement end side openings 34a that form a part of the cover opening 34) opened on the wiper strip 15 side are covered by the two connecting arrangement end side cover parts 18a of the flow regulating plate 18. In this way, in the interior space S (the hollow part) between the cover member 16 and the wiper strip 15, the size of the space, into which the fluid intrudes, is reduced (see the space Sz of FIG. 7, into which the fluid flow is limited). Thus, even at the time of high speed traveling of the vehicle, the flow of the fluid in the longitudinal direction is limited or reduced (in other words, the flow of the fluid is eased to flow toward the left side in FIG. 7, which is the rear side of the vehicle). Thus, unlike the previously proposed technique, it is possible to reduce the discharge of the liquid (the rain or washer fluid) toward the wiping surface 1a on the vehicle rear side of the wiper blade, which could happen when the liquid collides against, for example, the holding claws 22a during the flow movement of the liquid in the longitudinal direction. As a result, even at the time of high speed traveling of the vehicle, the improved visibility can be implemented. The parts (the width decreasing section receiving parts 31b), which correspond to the connecting arrangement end side openings 34a, are arranged outside of the opposed ends of the connecting arrangement receiving part 31a where no holding claw 22a exits. Thus, in the uncovered state, these parts form the relatively large spaces, into which the fluid intrudes. However, in the present embodiment, these parts are covered, so that the spaces, into which the fluid intrudes, is greatly reduced, and the fluid does not easily flow in the longitudinal direction.

(2) The connecting arrangement end side cover parts 18a are connected together by the cover part connectors 18b, and the connecting arrangement end side cover parts 18a and the cover part connectors 18b are formed integrally (the part number becomes one). Thus, it is possible to limit an increase in the number of components and complication of the assembling operation.

(3) Each of the two cover part connectors 18b is provided to connect between the corresponding transverse ends of the connecting arrangement end side cover parts 18a and is configured to reduce the size of the cover opening 34 at the corresponding position, which corresponds to the connecting arrangement 21a (FIG. 8). Thus, the spaces, into which the fluid intrudes, are reduced, and the flow of the fluid in the longitudinal direction becomes difficult.

(4) In the wiper blade 13, as indicated in FIG. 6, the transverse center of the wiper strip 15 is deviated from the transverse center of the cover member 16 (the cover opening 34) on the vehicle front side (on the right side in FIG. 6) in the direction perpendicular to the longitudinal direction to form an inflow reducing structure that constitutes a part of the flow regulating means. With the above structure, in the interior space S (the hollow part) between the cover member 16 and the wiper strip 15, the widths W1, W2 of the openings S1, S2, which are opened at the transverse ends of the wiper strip 15 are set such that the width W1 of the opening S1 at the vehicle front side is smaller than the width W2 of the opening S2 at the vehicle rear side. In other words, the space or the width W1 between a vehicle front side lateral surface 15b of the wiper strip 15 and an opposed vehicle front side opening edge of the cover opening 34 is smaller than the space or the width W2 between a vehicle rear side lateral surface 15c of the wiper strip 15 and an opposed vehicle rear side opening edge of the cover opening 34. Thus, the inflow of the fluid from the vehicle front side into the interior space S becomes difficult, and the outflow of the fluid from the interior space S at the vehicle rear side becomes easy. Therefore, the flow of the fluid in the interior space S in the longitudinal direction becomes difficult. Similarly, with reference to FIGS. 7 and 8, at the flow regulating plate 18, a space or a width W3 between the vehicle front side lateral surface 15b of the wiper strip 15 and an opposed edge of the vehicle front side lateral wall 18d of the flow regulating plate 18 is smaller than a space or a width W4 between the vehicle rear side lateral surface 15c of the wiper strip 15 and an opposed edge of the vehicle rear side lateral wall 18e of the flow regulating plate 18. This arrangement also makes the flow of the fluid in the interior space S in the longitudinal direction difficult. Thus, unlike the previously proposed technique, it is possible to reduce the discharge of the liquid (the rain or washer fluid) toward the wiping surface 1a on the vehicle rear side of the wiper blade, which could happen when the liquid collides against, for example, the holding claws 22a during the flow movement of the liquid in the longitudinal direction. As a result, even at the time of high speed traveling of the vehicle, the improved visibility can be implemented.

(5) In the wiper blade 13, as indicated in FIG. 6, the two opposed lateral walls 35a, 35b, which define the cover opening 34 of the cover member 16, are set such that the height h2 of the vehicle rear side lateral wall 35b measured from the wiping surface 1a is larger than the height h1 of the vehicle front side lateral wall 35a measure from the wiping surface 1a (the lateral wall 35b being placed in a higher position in FIG. 6 relative to the lateral wall 35a) to form the rear side opening increasing structure. Thus, the inflow of the fluid from the vehicle front side into the interior space S becomes difficult, and the outflow of the fluid from the interior space S at the vehicle rear side becomes easy. Therefore, the flow of the fluid in the interior space S in the longitudinal direction becomes difficult. Thus, unlike the previously proposed technique, it is possible to reduce the discharge of the liquid (the rain or washer fluid) toward the wiping surface 1a on the vehicle rear side of the wiper blade, which could happen when the liquid collides against, for example, the holding claws 22a during the flow movement of the liquid in the longitudinal direction.

As a result, even at the time of high speed traveling of the vehicle, the improved visibility can be implemented.

Furthermore, with the above structure, the negative pressure, which is generated on the vehicle rear side of the wiper blade 13, can be reduced. Also, it is possible to reduce the drawing of the accumulated liquid, which is accumulated around a front pillar (often referred to as "A pillar") of the vehicle, at the time of reverse swing movement of the wiper blade 13.

The above embodiment can be modified as follows.

In the above embodiment, the connecting arrangement end side openings 34a, which form the part of the wiper strip side opening that is opened on the wiper strip 15 side in the interior space S (the hollow part) between the cover member 16 and the wiper strip 15, are covered by the two connecting arrangement end side cover parts 18a. Alternatively, the above structure may be modified to cover at least a portion of the wiper strip side opening by a corresponding cover part. Furthermore, the flow regulating plate (the cover part) may be eliminated when at least one of the inflow reducing structure and the rear opening increasing structure is provided.

Figure 10:
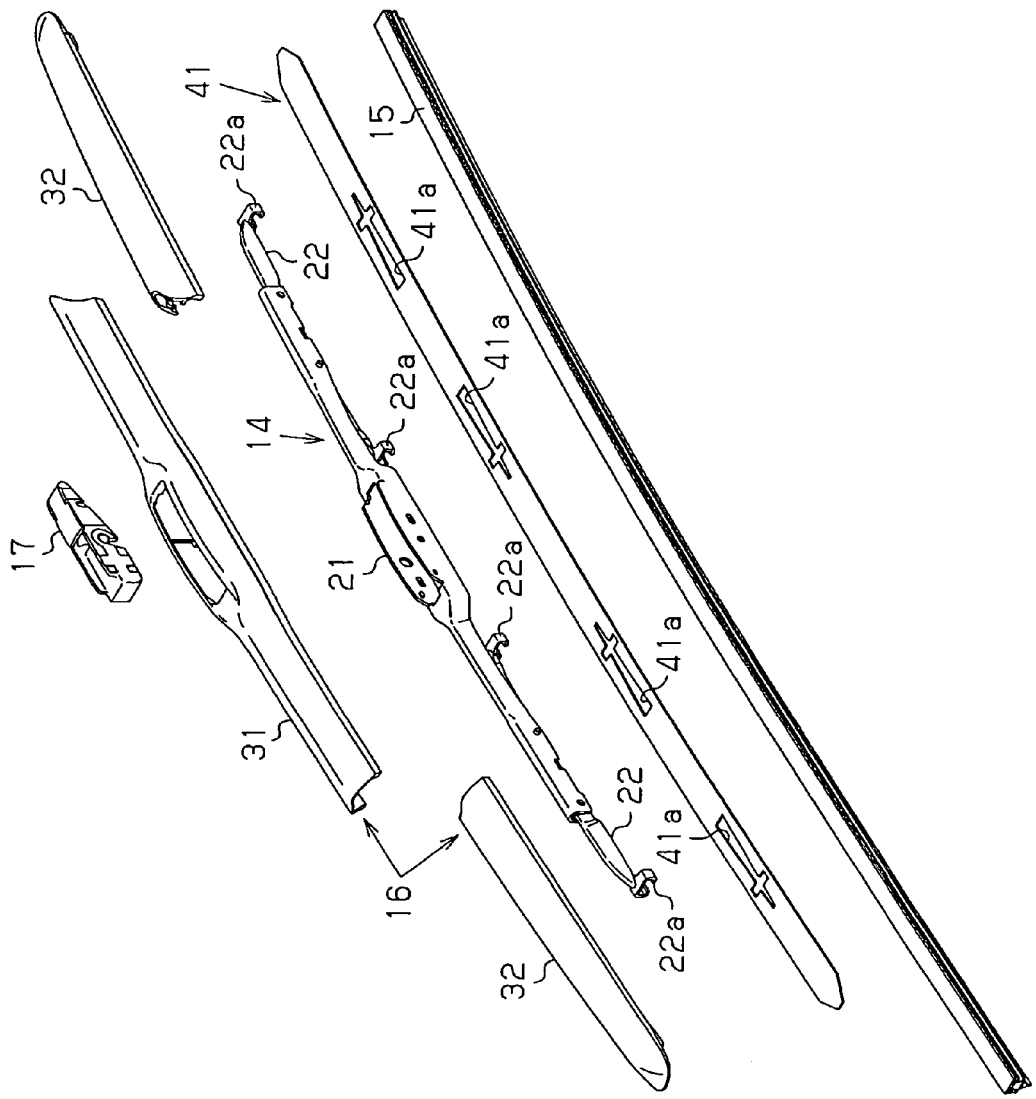
FIG. 10 is an exploded perspective view showing a modification of the wiper blade.
Figure 11:
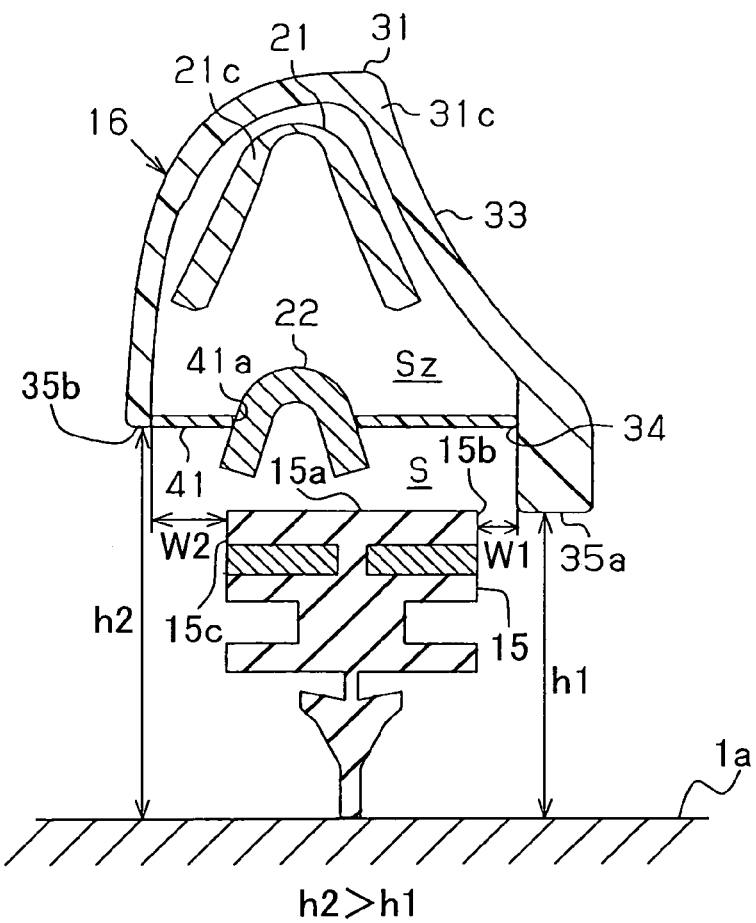
FIG. 11 is a cross sectional view of the wiper blade of FIG. 10.
Figure 12:
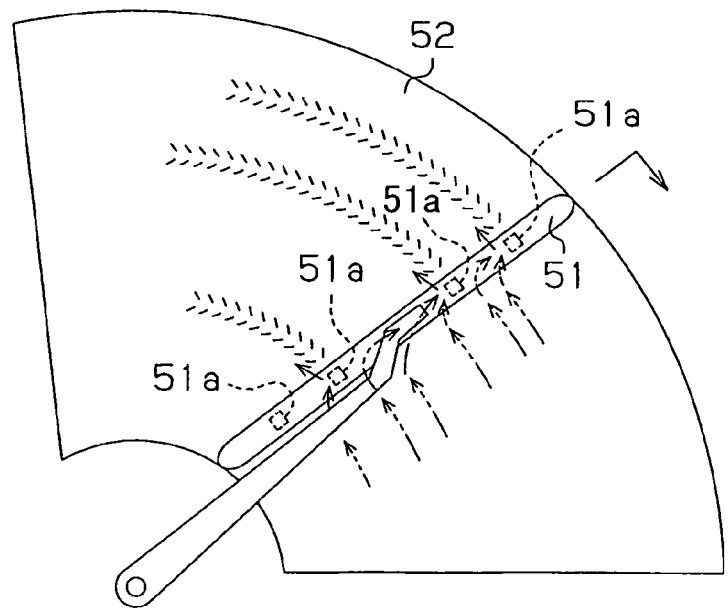
FIG. 12 is a schematic diagram for describing a disadvantage in a prior art technique.

For example, as shown in FIGS. 10 and 11, the flow regulating plate 18 can be replaced with a cover film 41. The cover film 41 serves as a cover portion or a cover covering part, which covers the cover opening 34 along the entire length of the cover opening 34 (including the connecting arrangement end side openings 34a), which is the wiper strip side opening. The cover film 41 is formed into a flexible plate, which is made of a resin material. The cover film 41 is fitted between the two walls 35a, 35b (FIG. 10) of the cover member 16 (the center cover portion 31 and the side cover portions 32) to cover the cover opening 34. The cover film 41 includes outlet holes 41a, through which the ends (including the holding claws 22a) of the secondary levers 22 are exposed downward of the cover film 41 upon installation of the cover film 41. With this structure, the cover opening 34 is covered along its entire length with the cover film 41. Thus, the spaces, into which the fluid intrudes, are reduced in the interior space S (hollow part) between the cover member 16 and the wiper strip 15 (see the space Sz of FIG. 11 where intrusion of the fluid is limited). Thus, even at the time of high speed traveling of the vehicle, the flow of the fluid in the longitudinal direction becomes difficult.

In the above embodiment, the two connecting arrangement end side cover parts 18a are connected by the cover part connectors 18b, and the connecting arrangement end side cover parts 18a and the cover part connectors 18b are formed integrally. Alternatively, the connecting arrangement end side cover parts 18a may be provided as separate components by eliminating the cover part connectors 18b.

In the above embodiment, the partition walls 18c are provided in the connecting arrangement end side cover parts 18a to partition between the connecting arrangement 21a and the corresponding width decreasing section 21b. Alternatively, the partition walls 18c may be eliminated.

In the above embodiment, each cover part connector 18b is configured to fill the corresponding space between the cover opening 34 (lateral wall 35a, 35b) and the corresponding opposed lateral wall 21e, 21f of the connecting arrangement 21a. Alternatively, the cover part connectors 18b may be configured to any other shape, which does not fill the above space.

In the above embodiment, the inflow reducing structure and the rear opening increasing structure are provided. Alternatively, one of the inflow reducing structure and the rear opening increasing structure may be eliminated (omitted). Furthermore, as long as the flow regulating plate 18 (the cover parts) is provided, both the inflow reducing structure and the rear opening increasing structure may be eliminated (omitted).

The lever assembly 14 of the above embodiment may be changed to any other type of lever member (a lever member other than the tournament type) as long as it has the connecting arrangement, which is connected to the wiper arm 12, and the holding parts (holding claws), which hold the wiper strip 15.

The cover member 16 (the center cover portion 31 and the side cover portions 32) may be changed to any other configuration of any other structure as long as the cover member 16 receives at least a portion of the lever assembly 14 (the lever member) through the cover opening. For example, the cover member 16 (the center cover portion 31 and the side cover portions 32) of the above embodiment has the fin surface 33. Alternatively, the cover member 16 may be changed to a cover member having no fin surface.

Additional advantages and modifications will readily occur to those skilled in the art. The invention in its broader terms is therefore not limited to the specific details, representative apparatus, and illustrative examples shown and described.

What is claimed is:

1. A wiper blade comprising:
   an elongated wiper strip that wipes a wiping surface of a vehicle;
   a lever member that includes:
      a connecting arrangement that is connected to a wiper arm of the vehicle; and
      at least one holding part that holds the wiper strip;
   a cover member that includes:
      a cover opening, which is opened on a wiper strip side of the cover member, wherein the cover member receives at least a portion of the lever member through the cover opening; and
      a connecting arrangement receiving part, which receives the connecting arrangement; and
   a flow regulating means that is arranged in an interior space between the cover member and the wiper strip, wherein
   the flow regulating means is for limiting a flow of fluid in a longitudinal direction of the wiper strip in the interior space,
   the flow regulating means includes two connecting arrangement end side cover parts that cover at least a portion of wiper strip side openings of the interior space, which are opened on a wiper strip side of the interior space at longitudinal ends of the connecting arrangement receiving part, and
   the flow regulating means further includes two partition walls, which are arranged at the longitudinal ends of the connecting arrangement receiving part and extend transversely to the longitudinal direction of the wiper strip to partition the interior space.

2. The wiper blade according to claim 1, wherein: the wiper strip has a top surface that is opposed to the cover opening of the cover member; and the interior space is formed between the top surface of the wiper strip and an interior of the cover member and extends in the longitudinal direction of the wiper strip.

3. The wiper blade according to claim 1, wherein the flow regulating means further includes at least one cover part connector, which is formed integrally with the two connecting arrangement end side cover parts and which connects the two connecting arrangement end side cover parts.

4. The wiper blade according to claim 1, wherein:
the cover member includes a vehicle front side lateral wall and a vehicle rear side lateral wall, which form the cover opening; and
a height of the vehicle rear side lateral wall, which is measured from a contact surface of the wiper strip, which is adapted to contact the wiping surface, to the vehicle rear side lateral wall, is greater than a height of the vehicle front side lateral wall, which is measured from the contact surface of the wiper strip to the vehicle front side lateral wall.

5. The wiper blade according to claim 4, wherein:
the flow regulating means further includes a vehicle front side lateral wall and a vehicle rear side lateral wall, which are formed separately from and correspond to the vehicle front side lateral wall and the vehicle rear side lateral wall, respectively, of the cover member; and
a height of the vehicle rear side lateral wall of the flow regulating means, which is measured from the contact surface of the wiper strip to the vehicle rear side lateral wall of the flow regulating means, is greater than a height of the vehicle front side lateral wall of the flow regulating means, which is measured from the contact surface of the wiper strip to the vehicle front side lateral wall of the flow regulating means.

6. The wiper blade according to 4, wherein a space between a vehicle front side lateral surface of the wiper strip and an opposed vehicle front side opening edge of the cover opening is smaller than a space between a vehicle rear side lateral surface of the wiper strip and an opposed vehicle rear side opening edge of the cover opening.

7. The wiper blade according to claim 6, wherein:
the flow regulating means further includes a vehicle front side lateral wall and a vehicle rear side lateral wall, which are formed separately from and correspond to the vehicle front side lateral wall and the vehicle rear side lateral wall, respectively, of the cover member; and
a space between a vehicle front side lateral surface of the wiper strip and an opposed edge of the vehicle front side lateral wall of the flow regulating means is smaller than a space between a vehicle rear side lateral surface of the wiper strip and an opposed edge of the vehicle rear side lateral wall of the flow regulating means.

8. The wiper blade according to claim 1, wherein the flow regulating means further includes a structure, in which a transverse center of the wiper strip is deviated from a transverse center of the cover member on a vehicle front side in a direction perpendicular to the longitudinal direction of the wiper strip.

9. A wiper blade comprising:
a wiper strip that wipes a wiping surface of a vehicle;
a lever member that includes:
a connecting arrangement that is connected to a wiper arm of the vehicle; and
at least one holding part that holds the wiper strip;
a cover member that includes a cover opening, which is opened on a wiper strip side of the cover member, wherein the cover member receives at least a portion of the lever member through the cover opening; and
a flow regulating means that is arranged in an interior space between the cover member and the wiper strip, wherein:
the flow regulating means is for limiting a flow of fluid in a longitudinal direction of the wiper strip in the interior space;
the cover member includes a vehicle front side lateral wall and a vehicle rear side lateral wall, which form the cover opening;
a height of the vehicle rear side lateral wall, which is measured from the wiping surface to the vehicle rear side lateral wall, is greater than a height of the vehicle front side lateral wall, which is measured from the wiping surface to the vehicle front side lateral wall;
the flow regulating means includes a vehicle front side lateral wall and a vehicle rear side lateral wall, which are formed separately from and correspond to the vehicle front side lateral wall and the vehicle rear side lateral wall, respectively, of the cover member; and
a height of the vehicle rear side lateral wall of the flow regulating means, which is measured from the wiping surface to the vehicle rear side lateral wall of the flow regulating means, is greater than a height of the vehicle front side lateral wall of the flow regulating means, which is measured from the wiping surface to the vehicle front side lateral wall of the flow regulating means.

10. A wiper blade comprising:
a wiper strip that wipes a wiping surface of a vehicle;
a lever member that includes:
a connecting arrangement that is connected to a wiper arm of the vehicle; and
at least one holding part that holds the wiper strip;
a cover member that includes a cover opening, which is opened on a wiper strip side of the cover member, wherein the cover member receives at least a portion of the lever member through the cover opening; and
a flow regulating means that is arranged in an interior space between the cover member and the wiper strip, wherein:
the flow regulating means is for limiting a flow of fluid in a longitudinal direction of the wiper strip in the interior space;
the cover member includes a vehicle front side lateral wall and a vehicle rear side lateral wall, which form the cover opening;
a height of the vehicle rear side lateral wall, which is measured from the wiping surface to the vehicle rear side lateral wall, is greater than a height of the vehicle front side lateral wall, which is measured from the wiping surface to the vehicle front side lateral wall;
a space between a vehicle front side lateral surface of the wiper strip and an opposed vehicle front side opening edge of the cover opening is smaller than a space between a vehicle rear side lateral surface of the wiper strip and an opposed vehicle rear side opening edge of the cover opening;
the flow regulating means includes a vehicle front side lateral wall and a vehicle rear side lateral wall, which are formed separately from and correspond to the vehicle front side lateral wall and the vehicle rear side lateral wall, respectively, of the cover member; and
a space between a vehicle front side lateral surface of the wiper strip and an opposed edge of the vehicle front side lateral wall of the flow regulating means is smaller than a space between a vehicle rear side lateral surface of the wiper strip and an opposed edge of the vehicle rear side lateral wall of the flow regulating means.

* * * * *